United States Patent [19]
Streets et al.

[11] Patent Number: 5,891,260
[45] Date of Patent: Apr. 6, 1999

[54] PRODUCT RECOVERY SYSTEM

[75] Inventors: Robert A. Streets, Oklahoma City; Thomas L. Streets, Norman, both of Okla.

[73] Assignee: The Benham Group, Oklahoma City, Okla.

[21] Appl. No.: 795,038

[22] Filed: Feb. 5, 1997

[51] Int. Cl.⁶ ........................................ B08B 9/04
[52] U.S. Cl. .......................... 134/8; 134/22.1; 134/22.11; 134/166 R; 134/166 C; 15/3.5; 15/3.51; 15/104.03; 15/104.05; 15/104.062
[58] Field of Search ........................ 134/8, 22.1, 22.11, 134/22.12, 22.18, 166 R, 166 C; 15/3.5, 3.51, 104.011, 104.03, 104.05, 104.062

[56] References Cited

U.S. PATENT DOCUMENTS

| | | | |
|---|---|---|---|
| 4,716,611 | 1/1988 | Barry | 15/3.51 |
| 4,724,007 | 2/1988 | Barry et al. | 134/8 X |
| 4,793,016 | 12/1988 | Valentine et al. | 15/104.062 |
| 5,113,895 | 5/1992 | Le Devehat | 137/244 |
| 5,127,472 | 7/1992 | Watson et al. | 166/177 |
| 5,139,576 | 8/1992 | Davis | 134/8 |
| 5,170,524 | 12/1992 | Vowles | 15/3.51 |
| 5,186,757 | 2/1993 | Abney, Sr. | 134/8 |
| 5,437,073 | 8/1995 | Smith | 15/104.061 |
| 5,442,826 | 8/1995 | Murata et al. | 15/3.51 |
| 5,444,886 | 8/1995 | Takashina et al. | 15/3.51 |
| 5,447,193 | 9/1995 | Peery | 165/95 |
| 5,457,841 | 10/1995 | Minton | 15/104.061 |
| 5,528,790 | 6/1996 | Curran | 15/104.061 |

FOREIGN PATENT DOCUMENTS

| | | |
|---|---|---|
| 9412043 | 9/1994 | Germany . |
| WO9117386 | 11/1991 | WIPO . |

OTHER PUBLICATIONS

Tuchenhagen North America, Inc., Tuchenhagen Introduces an Old Pig in a New Skin (no date) 5 pages.
Tri–Clover, catalog pages "771 throttling valves," (no date) 2 pages.

*Primary Examiner*—Maureen M. Wallenhorst
*Attorney, Agent, or Firm*—Robert Treece

[57] ABSTRACT

A product recovery system for recovering product from a pipeline having a supply end and a destination end and having a path of primary product flow from the supply end to the destination end. The product recovery system includes a pig launching station connected to and in communication with one end of the pipeline. The pig launching station has a pig parking chamber which holds a pig outside the primary product flow. The product recovery system has a pig catching station connected to and in communication with the destination end of the pipeline. The pig catching station includes a clean-in-place chamber for housing a pipeline pig while the pig is cleaned without removing the pig from the product recovery system. A valve may be used to push the pig out of the clean-in-place chamber so it may be returned up the pipeline.

17 Claims, 6 Drawing Sheets

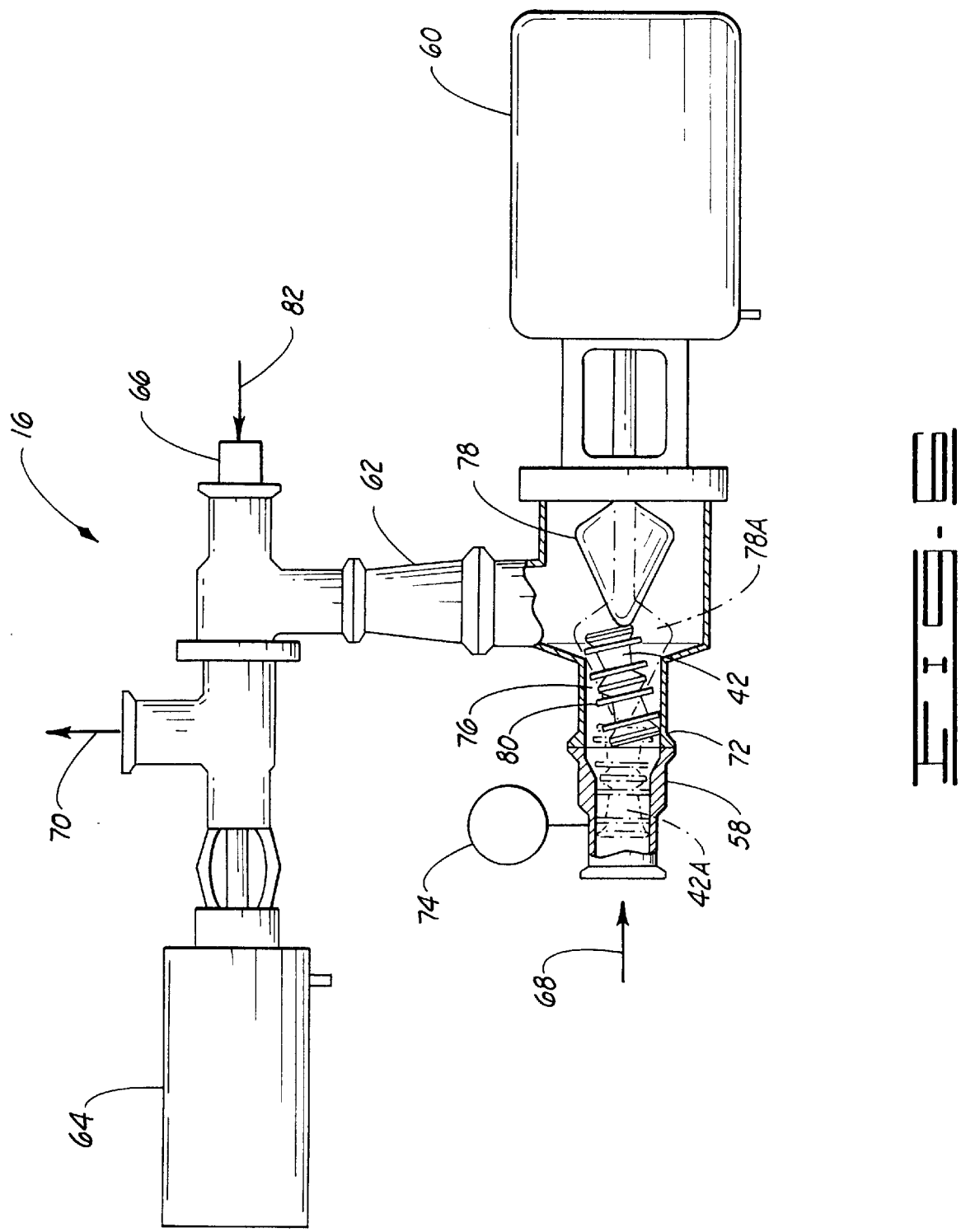

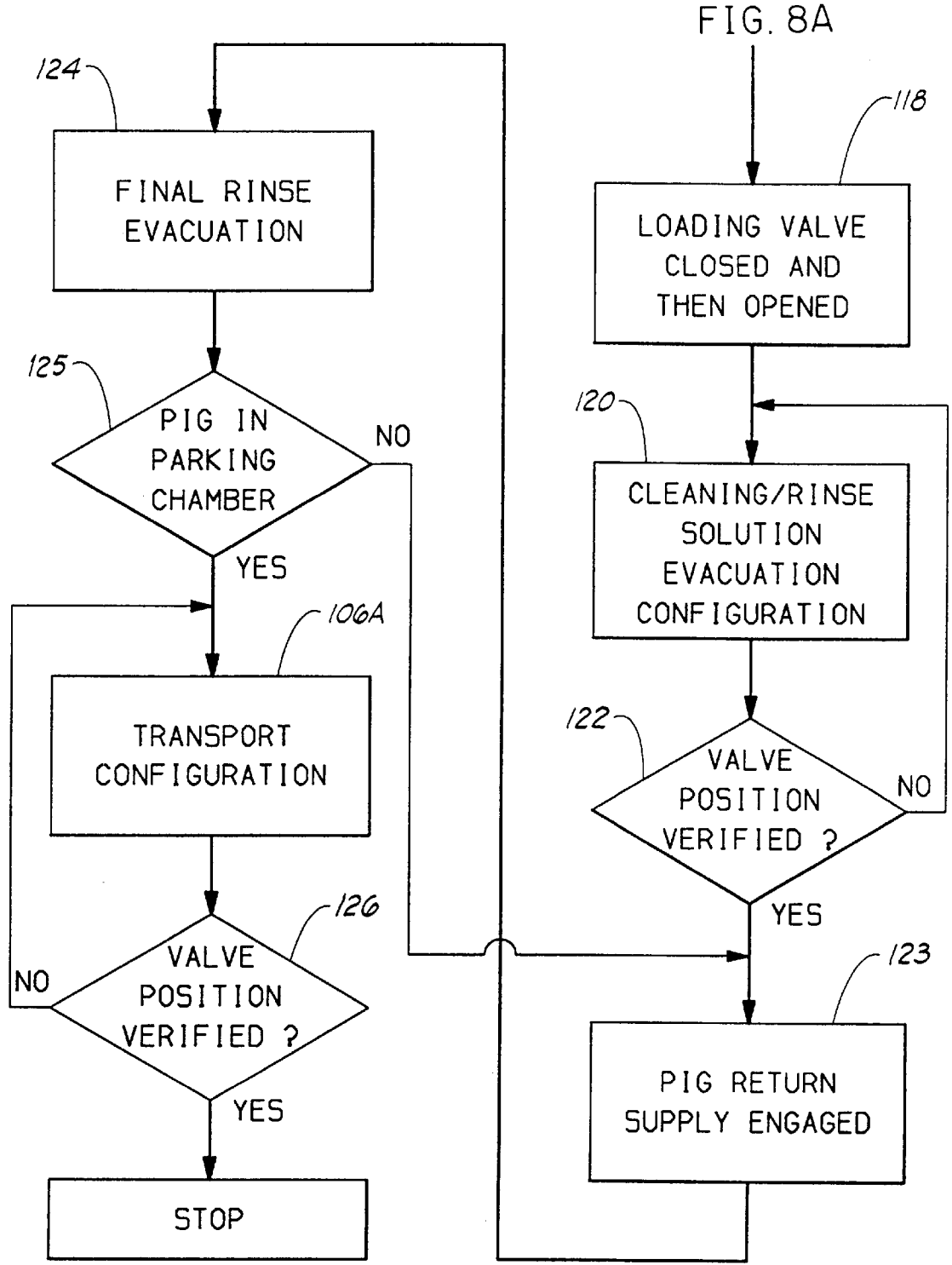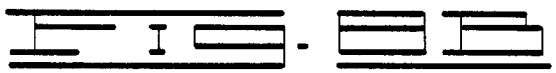

PRODUCT RECOVERY SYSTEM

FIELD OF THE INVENTION

The present invention relates to product recovery and cleaning systems for pipelines. More particularly the invention relates to the methods and apparatuses for using a projectile, or pipeline pig to recover product in pipeline in a piping system, wherein the pig itself is cleaned without removal from the piping system. This type of system may be called a "clean-in-place" or CIP system.

DESCRIPTION OF THE PRIOR ART

Pipeline pigs are commonly inserted into pipelines to measure or clean a pipeline, or to separate one product from another. In the area of product recovery pigging, a pig may be used to push valuable product out of a pipeline before the pipeline is cleaned. In this way, product is recovered and less cleaning solution is necessary to clean the pipeline. However, this type of pigging involves many steps, a great deal of expensive specialized equipment, involves moving the pig up and down a pipeline many times, and wastes a considerable amount of time.

One prior art product recovery device includes a pig which is held in an expensive specially constructed pig holding station by several rod-like members. The product flows around the pig to a destination until the end of the product run when the line is to be emptied. To empty the line the product flow is terminated and then the pig is released and pushed down the pipeline by air, water or the like, thereby forcing the product out. With a system such as this, the pig must be returned to the pig holding station before anything else, such as a cleaning solution, can be passed through the pipeline. Thus, it requires the pig to travel two times the distance of the pipeline each time it is used to push a substance.

In addition, with this previous type of system there may be difficulty in cleaning the points of contact, where the rod-like holding members contact the pig, since any product on the end of the rods would be held between the rod and the pig when the pig is returned to the holding station. The ability to clean is of utmost importance in sanitary systems such as systems delivering pharmaceutical, biochemical, dairy, food, beverage products or the like. In fact, meeting the minimum sanitary requirements of FDA 3-A is essential in many situations.

SUMMARY OF THE INVENTION

In view of the foregoing disadvantages inherent in the known types of pigging systems now present in the prior art, the present invention provides improved construction wherein the same can be utilized reliably in those situations where product recovery and/or cleaning is desired. As such, the general purpose of the present invention, which will be described subsequently in greater detail, is to provide a new and improved pigging system which has all the advantages of the prior art pigging devices and none of the disadvantages.

To attain this, the present invention essentially comprises a projectile (pig) launching station connected to a product piping system immediately downstream of a product supply point. A pig catching station is installed immediately upstream of a point of destination.

The pig launching station includes an pig parking chamber which may have a slightly greater interior diameter than the product piping for pigs with ribs. This slightly greater interior diameter will allow the ribs on a pig to relax somewhat so that they can flex in the opposite direction of pig travel (achieving the proper "squeegee" effect), thus allowing the pig to remain in the piping. A detector detects the presence of the pig in the pig parking chamber.

The catching station includes a clean-in-place chamber which has an interior diameter significantly larger than the product piping. The larger diameter allows fluid to flow past (and around) a pig when it is in this chamber. Thus, the pig and the product piping may be washed and rinsed after the product has been pushed out of the pipeline, and while the pig is in the clean-in-place chamber. A pig loading valve pushes the pig out of the clean-in-place chamber into the piping so the pig can travel back down the product piping.

At the end of a product run the system operation essentially includes the closing of a product supply valve and the opening of a pig pushing supply valve behind the pig. This pushes the pig out of the pig parking chamber, and up the line thereby forcing the product remaining in the line to the point of destination. As product is pushed to the point of destination the pig's scraping ribs clean the interior of the wall of the pipe and form an tight seal against the product.

The pig parking chamber is upstream from a dump valve. This arrangement simplifies the recovery and cleaning procedure because there are fewer valves at the pig launching station to be cleaned, when compared to currently available systems.

When the pig reaches the pig catching station a detector may sense the pig and signal a controller to start a clean-in-place cycle. During the clean-in-place cycle, cleanser and/or rinse fluids may be passed through the lines and around the pig. This cleans the lines and the pig. The clean-in-place chamber is large enough to allow the pig to rattle or move around when fluid passes thereby further facilitating the cleaning of the pig. The clean-in-place chamber is formed at least in part by a standard, but oversized, balancing valve, thereby reducing the cost of the system.

After the clean-in-place cycle is complete the tapered plug of the balancing valve pushes the pig into a receptor, thereby "loading" the pig into the original line size pipe with the scraper ribs, if a scraper pig is used, flexed in the proper direction. The arrangement of a destination valve and the pig loading valve simplifies the clean-in-place procedure since all the valves at the pig catching station are cleaned in the same cycle.

The system only requires the pig to travel down and back for total cleaning instead of the multiple trips required by current systems. The cleaning solution is run, at least for a time, with the dump valve open to clean that valve, the point of pig propulsion introduction, and the pig parking chamber. With the dump valve closed; the product supply valve, the piping, the scraper projectile, the pig loading valve and destination valve (which may be operated a few times to clean the point of pig propulsion required for the return of the pig) are all cleaned with the same cycle. The pig is now ready to return to its original position, pushing the final rinse out of the line, so the next product run will not be diluted. A valve leading to the destination closes and a pig propulsion valve opens to drive the pig back to the pig parking chamber and at the same time forcing the final rinse out an exit or drain. A sensor may be located in the pig parking chamber to signal a controller that the line is ready for the next product run.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved product recovery system which may be easily and efficiently manufactured and marketed.

It is a further object of the present invention to provide a new and improved product recovery system which is of a durable and reliable construction.

An even further object of the present invention is to provide a new and improved product recovery system which is susceptible of a low cost of manufacture with regard to both materials and labor, and which accordingly is then susceptible of lower prices of sale to the consuming public, thereby making such product recovery system economically available to the buying public.

Still another object of the present invention is to provide a new and improved product recovery system which provides advantages of the prior art, while simultaneously overcoming some of the disadvantages normally associated therewith.

Another object of the present invention is to provide a new and improved product recovery system which will reduce the time required to operate, reduce the wear on component parts, and which is generally more efficient and less expensive than current systems.

These objects together with other objects of the invention and along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is a view of a pig catching station which may be used with the product recovery system of FIG. 1.

FIGS. 8A and 8B are logic diagrams showing a sequence of operation which may be used with the product recovery system of FIG. 1.

DETAILED DESCRIPTION OF THE PREFERRED EMBODIMENTS

Figure 1:
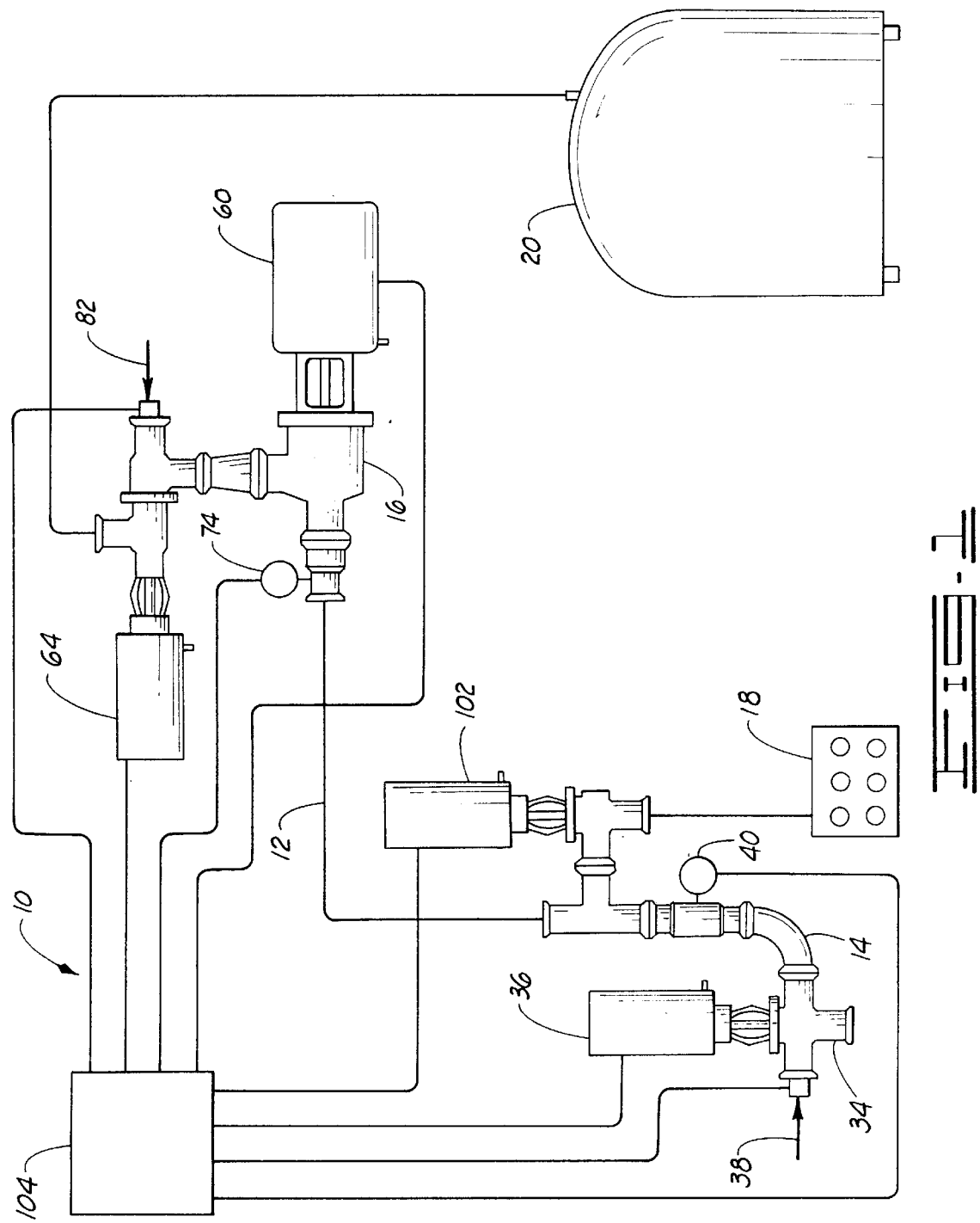
FIG. 1 is a schematic view of a product recovery system constructed in accordance with the present invention.

Referring to the drawings in detail and to FIG. 1 in particular, reference character 10 generally designates a product recovery system constructed in accordance with the present invention. Reference character 12 designates a product pipeline connected between a pig launching station 14 and a pig catching station 16 (the word "pig" is used herein to describe a projectile which may be sent through a pipeline and is not intended to limit the type of projectile which may be used). Upstream from the pig launching station 14 is a point of product supply 18, and downstream from the pig catching station 16 is a point of product destination 20. In this example a storage tank is shown as the point of destination, but it should be understood that other types of destinations may also be used with the system. Some other types of destinations include, by way of example and not limitation, packaging equipment, mixing areas, processing areas, transportation containers, tanker trucks, railroad cars, tubs, vats, vessels, boxes, bins, bottles, jars, cartons and jugs.

The product recovery system 10 is preferably installed to maximize the amount of product recovered. Thus, the pig launching station 14 is preferably at or very near the point of product supply 18, and the pig catching station 16 is at or very near the point of product destination 20. However, the product recovery system 10 may be installed at any point along a pipeline where product recovery or cleaning is desired. It should also be noted that in this example of the preferred embodiment the pig launching station 14 is up stream from the pig catching station 16. While this is the preferred arrangement the opposite may also be used. If the pig catching station 16 is placed upstream from the pig launching station 14 the product will be recovered back to the point of product supply 18 instead of being pushed on to the point of product destination 20.

Figure 2:
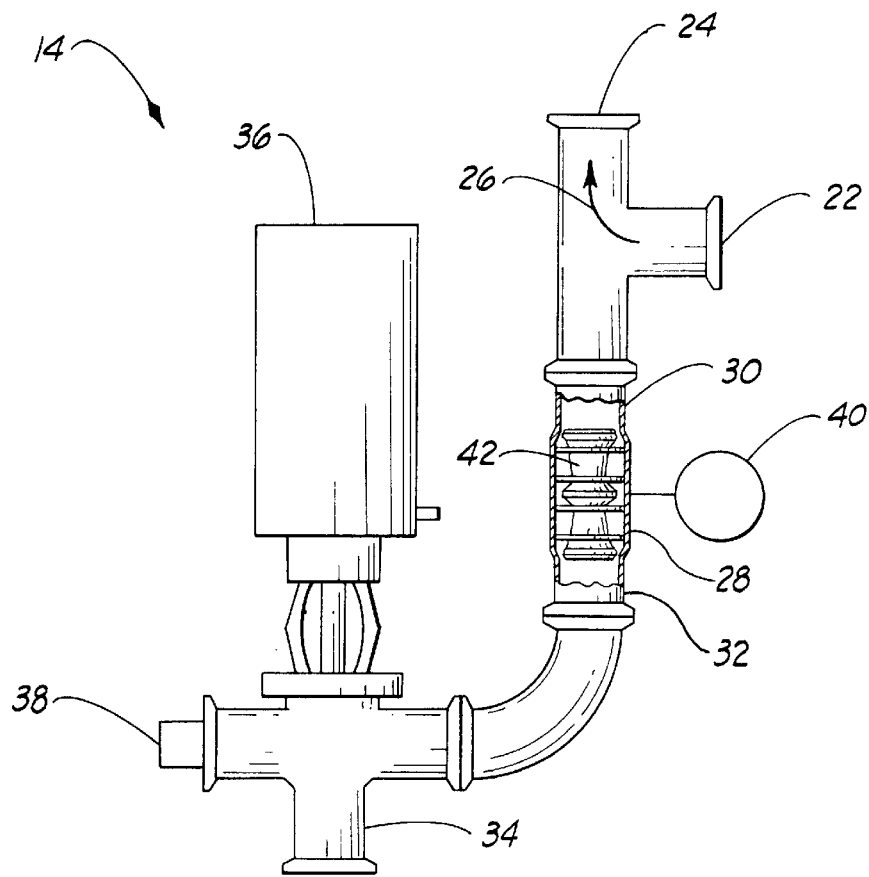
FIG. 2 is a view of a pig launching station which may be used with the product recovery system of FIG. 1.

FIG. 2 shows an enlarged view of the pig launching station 14. The station includes a product supply connection point 22 for attachment to the point of supply 18 (FIG. 1). This may be a standard pipe connection which is sized to match the size of pipe one desires to use to transport the product. One common size pipe which may be used with the product recovery system is 1½ inch pipe, but larger and smaller piping may be used. This description of the preferred embodiment will describe the product recovery system as being installed with a pipe size of 1½ inches, but this is not meant as a limitation since other pipe sizes may used with the invention.

The product supply connection may be connected to a single source of supply, or more preferably connected to a group of supply lines which may be easily selected. One way to accomplish the multiple supply connection is to use a swing panel to allow the selection of different supplies. FIG. 1 shows a schematic drawing of a typical swing panel designated as the point of supply 18.

A product discharge connection point 24 is provided for connection to the product pipeline 12. The path from the product supply connection point 22 through the product discharge point 24 defines the primary path of product 26 when it is being passed through the pipeline from the product supply 18 to the product destination 20.

A pig parking chamber 28 is located outside the primary path of product flow 26, but open to the primary path of product. The pig parking chamber is generally a conduit for housing the pig while product flows along the primary path of product flow. The conduit of the pig parking chamber 26 has a product end 30 and a discharge end 32. The product end is connected in a manner which allows a pig 42 to move from the pig parking chamber into the primary path of product flow when desired. The discharge end 32 is preferably connected to a discharge line which leads to a drain, storage container, recycle facility or the like.

A discharge valve 36 is located between the discharge end of the pig parking chamber and a discharge line 34 to close off the discharge line when desired. A pig pushing supply 38 is connected in communication with the discharge side of the pig parking chamber 28. In this way, when the discharge valve 36 is closed, propellant may be inserted into the line behind the pig 42 to cause it to move toward the pig catching station.

The propellant may be any gas or liquid which may be introduced into the line to move the pig. However, the preferred propellant for sanitary systems such as are used in dairy or the like is food grade compressed air.

A pig detector 40 may be located at the pig parking chamber 28 to provide an indication or signal when the pig 42 is located in the parking chamber 28. Preferably the detector 40 is a non-intrusive type, such as a magnetic detector. A magnetic detector may be used to sense a magnet or a piece of metal encapsulated inside the pig 42 and will provide a signal without physically entering the chamber.

Figures 3, 4:
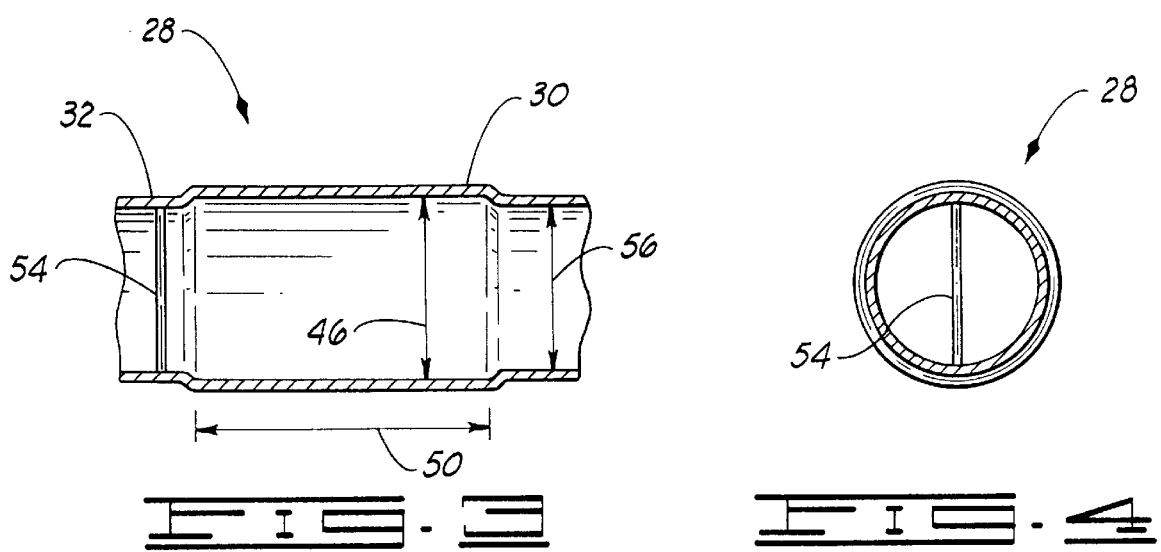
FIG. 3 is a longitudinal section view of one type of pig parking chamber which may be used with the pig launching station of FIG. 2.
FIG. 4 is an end view of the pig parking chamber of FIG. 3.

FIG. 3 shows the preferred embodiment for the pig parking chamber 28. This pig parking chamber is an easement chamber having a slightly greater interior diameter than the pipeline 12. This type of parking chamber is preferred since it will allow the use of a scraper pig with ribs to be bidirectional. The product recovery system may be used with other types of pigs, including those without scraper ribs, but it is believed that the use of a ribbed pig provides the best seal between the pig and the pipeline.

When a ribbed pig is used in a pipeline, the ribs, such as rib 44 (FIG. 5) are generally flexed away from the direction of travel. This is because the outside diameter of the ribs 48 is generally slightly larger than the inside diameter 56 of the pipeline. Thus, it would be difficult, if not impossible to back a pig up. The easement chamber of FIG. 3 provides a location with a greater interior diameter which will allow room for the ribs on the pig 42 to flex in the proper direction. In this way, the pig may come into the chamber from one end and then exit out the same end again with the ribs always flexed in the proper direction for the pig's travel.

To provide enough room for the ribs on the pig 42 to easily flex, the interior diameter 46 should be slightly larger than the outside diameter 48 of the pig. The overall length of the enlarged interior diameter portion of the easement chamber 50 should be at least as long as the distance 52 between the outermost ribs on the pig. A stop may be placed in the discharge end 32 of the pig parking chamber to stop the pig in the desired location. One suitable stop which may be used is a rod or bar extending across the discharge end of the easement chamber such as stop bar 54.

Figure 5:
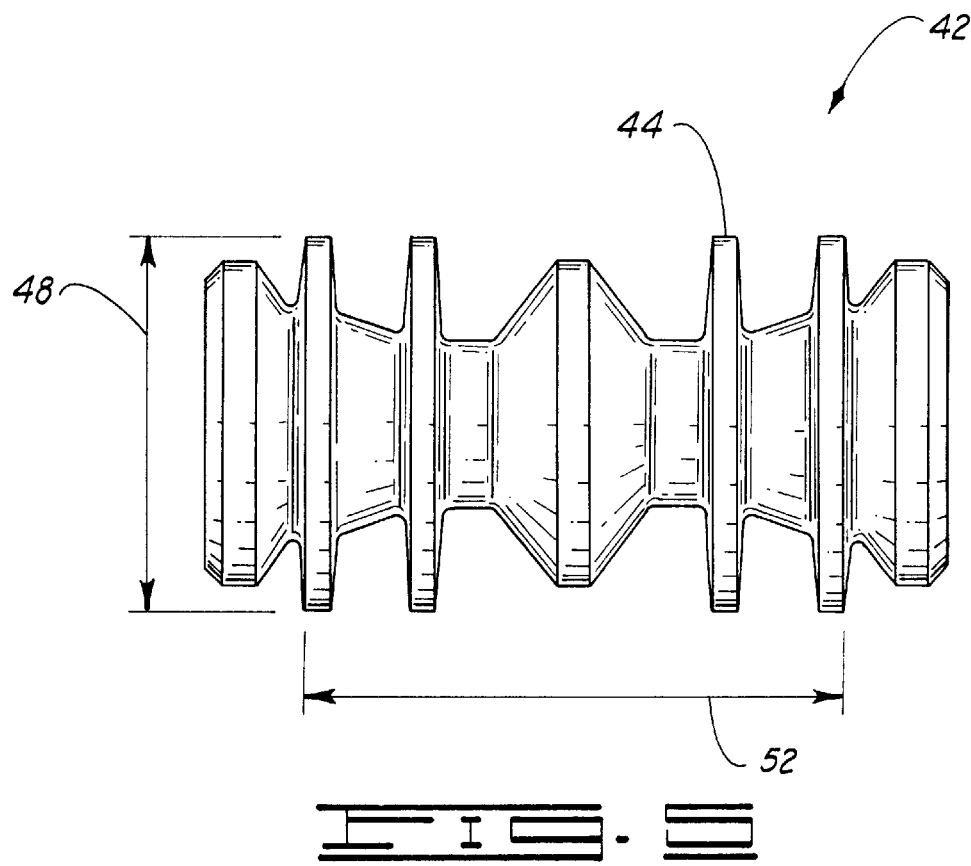
FIG. 5 is a view of a pig which may be used with the present invention.

FIG. 5 shows a ribbed pig which may be used with the current invention. While ribbed pigs are preferred due to the enhanced seal and cleaning ability of this type of pig, it should be understood that other types of pigs may be used with the current invention, and if a non-ribbed pig is used the pig parking chamber 28, need not be an easement chamber. That is, if a non-ribbed pig is used, the pig parking chamber 28 may be a conduit with a stopping means, but without a section of enlarged diameter.

Referring now to FIG. 6, shown therein is an enlarged view of the pig catching station 16. In general, the pig catching station includes a loading receptor 58, a loading valve 60, a reducer 62, a destination valve 64 and a pig return supply 66. The preferred direction of product flow into the pig catching station 16 is indicated by arrow 68 and the preferred direction of product flow out of the pig catching station 16 is indicated by arrow 70.

The loading receptor 58 is connected between the pipeline 12 (FIG. 1) and the loading valve 60. As will be described in detail when referring to FIG. 7, the loading receptor 58 serves as a guide for loading the pig 42 for a return trip up the pipeline 12 and as an adaptor for joining the pipeline with the loading valve inlet 72 which has a larger interior diameter opening than the pipeline. A detector 74 may also be located at the loading receptor 58 to produce a signal when the pig 42 is in the receptor 58.

The loading valve 60 includes a clean-in-place chamber 76 where the pig 42 may be cleaned without being removed from the product recovery system 10. To provide the amount of room preferred in the clean in place chamber 76 and to facilitate the reloading of the pig with the ribs flexed in the proper direction, the loading valve 60 is larger than would be necessary to simply shutoff or meter flow in the pipeline 12. For example, if the pipeline was constructed from 1½ inch pipe a valve suitable for throttling or shutting off the pipeline would be too small to use as the loading valve. In fact, in the example of a 1½ inch pipeline, the loading valve could be the one which is normally selected for the next larger size of pipe (i.e. 2 inch pipe). One suitable loading valve for 1½ inch pipe is the TRI-CLOVER 771L-10M-ACT-2-316L. Other manufactures may make suitable valves and this particular valve is listed by way of example and not limitation. When dealing with larger pipeline sizes it may be necessary to choose a valve 60 designed for a pipe more than a single size larger than the pipeline, but by using a larger stock valve as the loading valve 60 the need to custom make a loading mechanism is eliminated.

The clean-in-place chamber is sized so cleaning solution may pass around the pig and exit the pig catching station 16. Preferably, sufficient room is provided in the clean-in-place chamber 76 to allow the pig 42 to move or vibrate when cleaning solution passes the pig. In this way, the cleaning action of the solution on the pig itself is enhanced.

In determining the size of the loading valve 60, the clean-in-place chamber 76 and the pig 42 it is important that the pig 42 is held in the clean-in place chamber by the valve plug 78 while providing sufficient clearance for solution to pass through the pig catching station. The valve 60 should also have enough throw to push the pig back into the loading receptor 58 so that the circumference of at least one rib on the pig is contacting the interior surface of the loading receptor 58. Pig 42A is shown in the "ready to return" position after being pushed from the clean-in-place position 80 into the receptor 58 by the extended valve plug 78A.

The reducer 62 may be included if it is desirable to return to the original size of the pipeline 12. Of course one could continue all or part of the way to the point of product destination with the larger size pipe, but it is preferable to return to the original pipeline size. This is particularly true when the product recovery system 10 is added to an existing pipeline, since the pig launching station 14 and the pig catching station 16 can be inserted into the existing pipeline without the necessity of changing out the pipeline itself.

Between the loading receptor 58 and the point of product destination 20 are located the destination valve 64 and the pig return supply 66. The destination valve 64 should be closer to the point of product destination 20 than the pig return supply 66. In this way, the destination valve 64 may be closed to the destination and fluid (liquid or gas, but preferably gas and most preferably food grade compressed air) may be inserted into the system between the closed destination valve 64 and the pig 42 as indicated by arrow 82. This will push the pig back up the pipeline 12 to the pig launching station 14.

Figure 7:
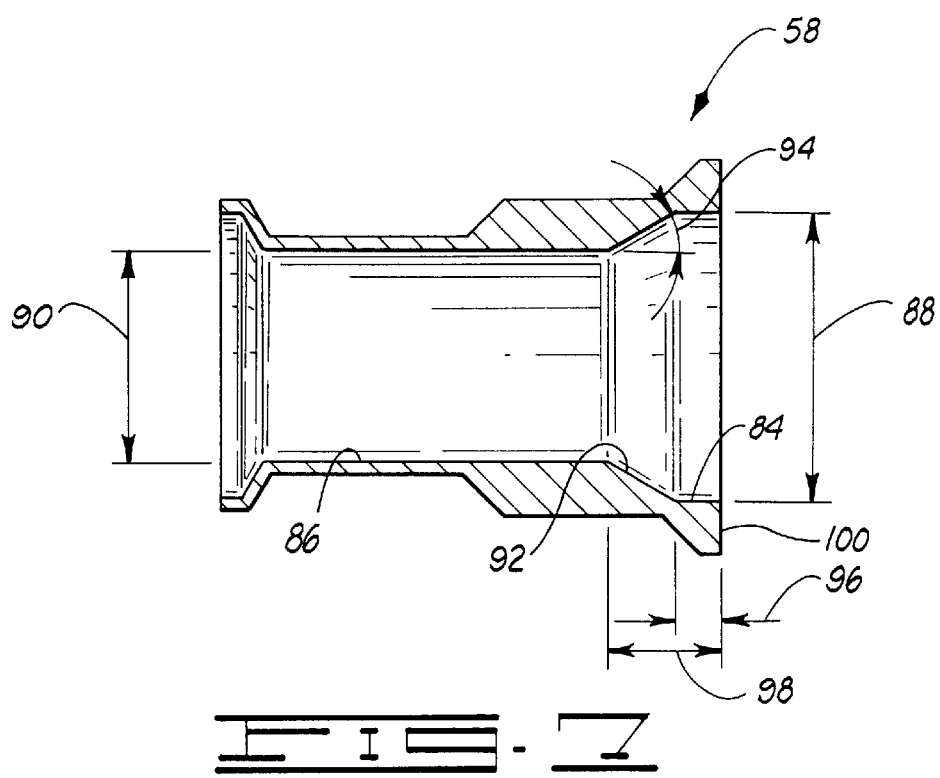
FIG. 7 is a view of a receptor which may be used with the pig catching station of FIG. 6.

FIG. 7 shows an enlarged sectional view of the loading receptor 58. As previously stated the loading receptor provides the dual function of a reducer and a guide. The receptor 58 reduces the ID from that of the loading valve to that of the pipline 12. In addition, the interior surface of the receptor is shaped such that it will guide the pig into the smaller ID so the pig's ribs are flexed in the proper direction and it is ready to return back up the pipeline 12. To accomplish this the reducer 58 has an area with a larger ID, which will generally match up with the ID 88 of the loading valve 60, and an area with a smaller ID which will generally match up with the pipeline ID 90. Between the area of larger ID 84 and the area of smaller ID 86 is at least one area having a tapered ID, such as area 92. The angle 94 of the tapered area 92 should be steep enough to allow the pig 42 to have room to move once in the clean-in-place chamber 76 but shallow enough to allow the pig 42 to be smoothly guided into the area of smaller ID 86. Preferably the angle of the taper 94 is between ten and sixty degrees, more preferably the angle of the taper 94 is between twenty and forty degrees, and most preferably the angle of the taper 94 is about thirty degrees.

The distance from the discharge end 100 to the beginning of the tapered area 96, and the distance from the discharge end 100 to the end of the tapered area 98 is determined by several factors, including the length and diameter of the pig, the position of the valve plug when in extended position 78A and the angle of the tapered area 94. In general, when the pig 42 has been pushed into the ready to return position 42A at least one rib on the pig should be close enough to the interior surface of either the loading receptor 58 or the pipeline 12 to cause the pig to move when fluid is inserted into the clean-in-place chamber. More preferably at least one rib on the pig is in contact and forms a seal between the pig and the interior surface of the loading receptor 58.

Figure 8A:
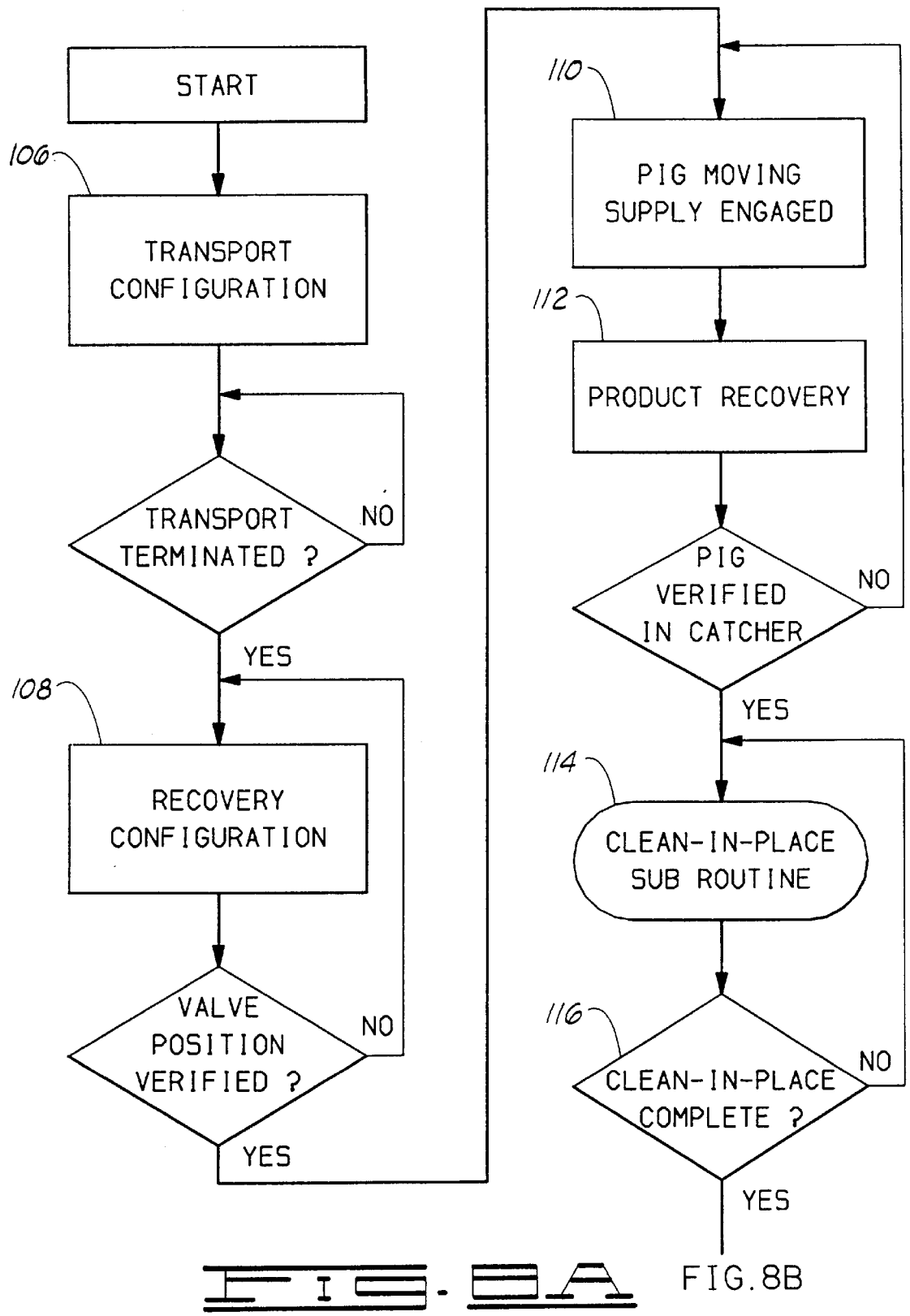

The product recovery system 10 may be controlled manually, but preferably is automated. Since each of the valves may be operated and verified by a remote signal and since the pig location may be detected at one or more locations this may be accomplished by connecting the valves 36, 60, 64 and 102, along with sensors 40 and 74, and supplies 38 and 82 to an electronic controller 104. One way for the controller to automate the product recovery system is for the controller 104 to be programmed to follow the logic diagram shown in FIGS. 8A and 8B which will be referenced during the following discussion of the operation of the invention.

The following operation of the invention describes the preferred steps in operating the product recovery system 10. These steps may be followed manually or the steps may be partially, or completely, automated through the use of an electronic controller and a program. Starting with the product recovery system in a transport configuration (step 106) product may be transported from the point of product supply 18 to the point of product destination 20. In this configuration, the product supply valve 102 is open, and the destination valve 64 is open to destination 20. The discharge line valve 36 is closed to prevent the loss of product through the discharge line 34. The pig loading valve 60 is also open so it will not impede the flow of product. In an automated system, the end of the product transport may be signaled by a supply signal, a destination signal, an amount transported signal or other signal indicating the end of the transport, or the need to end the transport.

Once transport has been terminated, the system configuration should be changed to a recovery configuration (step 108). In the recovery configuration the product supply valve 102 and the discharge line valve 36 are closed, and the pig loading valve 60 and the destination valve 64 are open to downstream. The valve positions should be verified and then the pig moving supply 38 should be engaged. The pig moving supply 38 may introduce a gas or fluid such as compressed air (step 110). This will cause the pig 42 to leave the pig launching station 14 and move to the pig catching station 16. As the pig moves through the pipeline 12 the pig's ribs form a seal with the interior walls of the pipeline and therefore, product is pushed along in front of the pig and recovered in the destination 20 (step 112). Once the pig 42 reaches the pig catching station 16, as can be verified by sensor 74, the pipeline 12 and the pig 42 can be cleaned in place.

The clean in place routine step 114, for cleaning the pipeline 12 and the pig 42 in place can and will vary depending on the type of product transported and the amount of cleaning desired. The product recovery system 10 will allow one to meet strict cleanliness and purity standards, including but not limited to the FDA 3-A standards. Generally, at least one cleaning solution and one rinse solution are passed through the lines. By way of example, and not limitation, one may introduce a cleaning solution with the discharge valve 38 open for a short period of time to clean the pig launching station 14, and then close the discharge valve 38 to clean the pipeline 12, the pig, and the pig catching station 16. A rinse solution may then be passed through the lines in the same manner.

After the clean-in-place is complete (step 116) the final rinse should be removed from the pipeline 12 to reduce or prevent dilution of the next product run. To do this, the pig is reloaded into the ready to return position 42A by cycling the pig loading valve 60. First closing the pig loading valve 60 thereby loading the pig, and then opening the valve 60 again (step 118).

To place the product recovery system 10 in a cleaning/rinse solution evacuation configuration, the product supply valve 102 is closed, and the destination valve 64 is closed to the destination 20 and open to the pig propellant 82. The pig loading valve 60 and the discharge valve 34 are open (step 120). Preferably the valve positions are then verified (step 122) and then fluid or gas is inserted between the pig and the destination valve (step 123) to cause the pig to move toward the pig launching station 14. As the pig moves through the pipeline 12 the final rinse is pushed to the discharge line 34 thereby evacuating the final rinse from the system (step 124). When the pig reaches the pig parking chamber 28 it is stopped by the stop bar 54. Detector 40 confirms the pig's return to the parking chamber (step 125), and the valves are returned to the transport configuration (step 106A) as described in step 106 above. Preferably the valve positions are verified (step 126) and the system is ready to transport another product.

Changes may be made in the combinations, operations and arrangements of the various parts, elements and steps described herein without departing from the spirit and scope of the invention as defined in the following claims.

We claim:

1. A product recovery system for recovering product from a pipeline having a supply end and a destination end and having a primary product flow from the supply end to the destination end, the recovery system comprising:

a pig launching station connected to and in communication with one end of the pipeline, said pig launching station including a pig parking chamber outside the primary product flow; and a pig catching station connected to and in communication with the other end of the pipeline, said pig catching station including a clean-in-place chamber for housing a pipeline pig while the pig is cleaned without removing the pig from the product recovery system, wherein said clean-in-place chamber allows the pig to move around therein when fluid passes thereby further facilitating the cleaning of the pig.

2. The product recovery system of claim 1 wherein the pig launching station is connected to the pipeline nearer to the supply end than to the destination end, and wherein the pig catching station is connected to the pipeline nearer to the destination end than to the supply end.

3. The product recovery system of claim 2 wherein the pig catching station includes a loading valve sized and positioned to prevent a pig from proceeding down stream when the valve is in the open position, and for pushing the pig out of the clean-in-place chamber when in the closed position.

4. The product recovery system of claim 3 wherein the pig catching station includes a loading receptor for guiding a pig from the clean-in-place chamber with a larger interior diameter to an area with a smaller interior diameter when the pig is pushed by the loading valve.

5. The product recovery system of claim 1 further comprising a pipeline pig having at least one rib thereon, said pig having an exterior diameter, and wherein the pig parking chamber, has an interior diameter greater than or equal to, the exterior diameter of the pig.

6. The product recovery system of claim 1 wherein the pipeline has an interior diameter, and the pig launching station includes an easement chamber with at least a portion thereof having an interior diameter larger than the interior diameter of the pipeline.

7. The product recovery system of claim 6 further comprising a pipeline pig having at least one rib, said pig having an exterior diameter, and wherein the exterior diameter of the pig is larger than the interior diameter of the pipeline, and smaller than the interior diameter of the easement chamber.

8. The product recovery system of claim 1 wherein the pig parking chamber includes a stop for stopping a pig in said pig parking chamber.

9. A method for recovering product and cleaning a pipeline comprising the steps of:

moving a pipeline pig down a pipeline to push product to a point of destination;

catching said pig in a clean-in-place chamber having sufficient room therein for cleaning solution to pass around the pig while it is in the clean-in-place chamber;

inserting cleaning solution into the pipeline and causing the pig to move about in the clean-in-place chamber;

pushing said pig out of the clean-in-place chamber and into a ready to return position with a valve; and moving said pig back up the pipeline to a pig parking chamber and thereby pushing cleaning solution to a discharge line.

10. The method of claim 9 wherein the step of pushing the pig out of the clean-in-place chamber comprises: cycling a standard valve so a valve plug will push the pig.

11. The method of claim 9 further comprising the step of: holding the pig out of a primary path of product flow when the pig is in the pig parking chamber.

12. A product recovery system for recovering product from a pipeline comprising:

a pipeline;

a pig parking chamber connected to the pipeline; and a clean-in-place chamber connected to the pipeline which allows a pig inside the clean-in-plate chamber to move around when fluid passes thereby to facilitate cleaning of the pig.

13. The product recovery system of claim 12 further comprising means for moving a pig from the pig parking chamber into a path of primary product flow in the pipeline.

14. The product recovery system of claim 13 wherein the means for moving a pig from the pig parking chamber into the path of primary product flow is the introduction of compressed air.

15. The product recovery system of claim 14 wherein the clean-in-place chamber has an interior diameter, and the pipeline has an interior diameter, and wherein the product recovery system further comprises: a receiver connected between the clean-in-place chamber and said pipe line, wherein said receiver includes an area of larger interior diameter, an area of smaller interior diameter and an area of tapered interior diameter there between, said area of larger interior diameter having an interior diameter generally equal to the interior diameter of the clean-in-place chamber, and the said area of smaller interior diameter having an interior diameter generally equal to the interior diameter of the pipeline.

16. The product recovery system of claim 12 further comprising means for moving a pig from the clean-in-place chamber to the pipeline.

17. The product recovery system of claim 16 wherein the means for moving a pig comprises a standard valve having a valve plug wherein said valve plug is positioned to push a pig from the clean-in-place chamber into a receiver.

* * * * *